United States Patent
Grebe

(10) Patent No.: US 7,490,632 B2
(45) Date of Patent: *Feb. 17, 2009

(54) FLEXIBLE HOSE, PREFERABLY A CHARGE-AIR HOSE FOR AUTOMOTIVE VEHICLES

(75) Inventor: Thomas Grebe, Biebergemünd (DE)

(73) Assignee: Veritas AG, Gelnhausen (DE)

( * ) Notice: Subject to any disclaimer, the term of this patent is extended or adjusted under 35 U.S.C. 154(b) by 367 days.

This patent is subject to a terminal disclaimer.

(21) Appl. No.: 11/187,816

(22) Filed: Jul. 25, 2005

(65) Prior Publication Data

US 2006/0022468 A1 Feb. 2, 2006

(30) Foreign Application Priority Data

Jul. 30, 2004 (DE) .................. 10 2004 037 088

(51) Int. Cl.
*F16L 11/00* (2006.01)
(52) U.S. Cl. .................. 138/121; 138/122; 138/114; 138/137; 138/140
(58) Field of Classification Search ................ 138/121, 138/120, 137, 140, 141, 122
See application file for complete search history.

(56) References Cited

U.S. PATENT DOCUMENTS

| | | | | | |
|---|---|---|---|---|---|
| 1,819,175 | A | * | 8/1931 | James | 138/122 |
| 2,891,581 | A | * | 6/1959 | Roberts | 138/121 |
| 2,898,941 | A | * | 8/1959 | Kilcup | 138/121 |
| 3,248,272 | A | * | 4/1966 | Sawada | 156/143 |
| 3,330,303 | A | * | 7/1967 | Fochler | 138/120 |
| 3,626,988 | A | * | 12/1971 | Chu | 138/121 |
| 4,261,671 | A | * | 4/1981 | Langner | 405/166 |
| 4,269,234 | A | * | 5/1981 | Johnson et al. | 138/121 |
| 4,312,383 | A | * | 1/1982 | Kleykamp | 138/103 |
| 4,415,185 | A | * | 11/1983 | Vinciguerra et al. | 285/114 |
| 4,421,437 | A | * | 12/1983 | Langner | 405/166 |
| 4,487,232 | A | * | 12/1984 | Kanao | 138/122 |
| 4,620,569 | A | * | 11/1986 | von Glanstatten et al. | 138/132 |
| 4,754,781 | A | * | 7/1988 | Jan de Putter | 138/98 |
| 5,148,837 | A | * | 9/1992 | .ANG.gren et al. | 138/121 |
| 5,390,704 | A | * | 2/1995 | Kanao | 138/121 |
| 5,803,132 | A | * | 9/1998 | Lupke | 138/141 |
| 5,975,143 | A | | 11/1999 | Järvenkylä et al. | |
| 6,186,182 | B1 | * | 2/2001 | Yoon | 138/122 |
| 6,644,357 | B2 | * | 11/2003 | Goddard | 138/121 |
| 7,089,965 | B2 | * | 8/2006 | Cheng et al. | 138/121 |
| 2004/0241368 | A1 | * | 12/2004 | Iwata et al. | 428/36.91 |

FOREIGN PATENT DOCUMENTS

| | | |
|---|---|---|
| DE | 1 955 729 | 2/1967 |
| DE | 195 06 584 C1 | 5/1996 |
| DE | 199 60 427 C1 | 2/2001 |
| DE | 695 18 859 T2 | 3/2001 |
| FR | 1.346.924 | 11/1963 |

* cited by examiner

*Primary Examiner*—Patrick F Brinson
(74) *Attorney, Agent, or Firm*—Buchanan Ingersoll & Rooney PC

(57) ABSTRACT

The present invention relates to a flexible hose, preferably a charge-air hose for automotive vehicles, comprising at least one corrugated portion and a substantially tubular portion which is arranged at least sectionwise within the corrugated portion. In order to facilitate the mounting of such hoses, the present invention is so conceived that the corrugated portion is formed integrally with the tubular portion, and that the tubular portion is introduced, from an extended position in which the corrugated and the tubular portion are arranged in succession, into the corrugated portion by turning said tubular portion outside in.

19 Claims, 2 Drawing Sheets

FLEXIBLE HOSE, PREFERABLY A CHARGE-AIR HOSE FOR AUTOMOTIVE VEHICLES

The present invention relates to a flexible hose, preferably a charge-air hose for automotive vehicles, comprising at least one corrugated portion and a substantially tubular portion which is arranged at least sectionwise within the corrugated portion.

Such hoses are known in a general form from the prior art. Most of them are made of an elastomer material and are used as so-called charge-air hoses in particular for turbo diesel engines. They serve to convey the intake air of the internal combustion engine in the manner known. Their structural design is substantially similar to that of a bellows and, consequently, they have a certain elasticity so that they can be installed in engine compartments, which become increasingly narrow and jam-packed with structural components, and so that the engine can, in this way, be decoupled from the rest of the vehicle as far as engine noise is concerned. Due to the pulsating mode of operation of an internal combustion engine, the charge-air hoses are caused to vibrate. In addition, vibrations are transmitted to the charge-air hoses by the turbocharger arranged in the intake circuit. The charge-air hoses are subjected to high loads, when in use. Due to the vibrations, high-frequency noise is additionally generated. Since the general silencing demands on charge-air hoses and automotive vehicles become increasingly strict, attempts have been made to provide the known charge-air hoses with tube-like portions extending, at least partially, into the corrugated portion of the charge-air hose. This allows resonating cavities to be formed between the tubular portion and the corrugated portion; these resonating cavities can lead to a reduction of the noise level. The production of such hoses is, however, comparatively complicated. Hence, these hoses are only used in comparatively expensive vehicles.

It is the object of the present invention to further develop a flexible hose of the type referred to at the beginning in such a way that it can be produced at a reasonable price and in a simple manner on the one hand, and has sufficient silencing properties on the other.

According to the present invention, this object is achieved by a flexible hose of the type mentioned at the beginning, in the case of which the corrugated portion is formed integrally with the tubular portion, and the tubular portion is introduced, from an extended position in which the corrugated and the tubular portion are arranged in succession, into the corrugated portion by turning said tubular portion outside in.

This solution is simple and has the advantage that the flexible hose can be produced in one piece so that the corrugated and the tubular portion are produced together. The flexible hose can be produced in a less complicated and economy-priced manner by turning the tubular portion outside in and introducing it thus in the corrugated portion. This can be done by means of comparatively simple tools. Especially in series production processes, this is an advantage of decisive importance. The shaping measures can be carried out at a single blank, and they can be executed by a simple additional step immediately after the production of the flexible blank in its extended position. In comparison with conventional flexible hoses with tubular portions, the production will not only be substantially simplified, but good silencing properties will be achieved as well.

According to an advantageous embodiment of the present invention, the tubular portion can extend over the entire length of the corrugated portion. The vibration behavior of the hose can thus be improved and noise generation reduced still further.

For forming resonating cavities, the tubular portion can comprise openings, at least one of said openings being arranged within a corrugation of the corrugated portion. The air conveyed by the hose can thus penetrate into the resonating cavities formed between the tubular portion and the corrugated portion, whereby energy will be absorbed and whereby the noise will be reduced substantially.

In this connection, it may be of advantage when the tubular portion comprises a plurality of openings, each of said openings being associated with one of said corrugations. The vibration behavior can thus be improved still further and noise generation can be reduced.

In addition, it may also be prove to be advantageous, when the tubular portion and the corrugated portion are sectionwise in contact with one another at least in the area of the corrugations. This allows a formation of closed resonating cavities, which are each delimited by the respective corrugation and the tubular portion. Air can penetrate into said resonating cavities through the openings.

Furthermore, it may prove to be advantageous, when the wall thickness of the corrugated portion corresponds essentially to the wall thickness of the tubular portion.

In this connection, it may prove to be advantageous, when the inner diameter of the tubular portion corresponds essentially to 10 to 15 times the wall thickness of the tubular portion. This wall thickness offers the possibility of achieving a good compromise between the form-ability during the process of turning the tubular portion outside in and a sufficient strength for obtaining the desired silencing properties.

According to another embodiment, a stabilizing means can be provided on the corrugated portion. The stiffness of the hose can be increased in this way for reducing thus the noise level and for increasing the strength of the hose.

It may be of advantage, when the stabilizing means comprises a plurality of spaced-apart stabilizing elements. This allows the strength of the hose to be increased precisely at the desired locations.

The stiffness of the hose can be increased, when the stabilizing elements are arranged in wave troughs of the corrugated portion.

The stiffness can also be increased when the respective stabilizing elements are arranged adjacent to the corrugations. In particular, the stabilizing elements can then delimit the corrugated portion on both sides thereof.

In addition, it may prove to be advantageous, when the stabilizing elements encompass the corrugated portion in the form of rings. This is a simple method of increasing the stiffness of the flexible hose.

According to an advantageous further development of the present invention, the hose can comprise a plurality of layers, including at least one outer layer, in certain sections thereof. The vibration properties of the hose can be accurately influenced in this way. In addition, the outer layer can serve as a protective layer so as to increase the resistance of the hose. In principle, it would also be imaginable to provide such an outer layer in the case of a hose which does not comprise a tubular portion or in the case of which the tubular portion is arranged in the hose in the manner known It may prove to be advantageous, when the outer layer is arranged in the area of the corrugations. This is precisely the area where the hose is subjected to the highest loads. In addition, there is the risk that these areas may be subjected to shocks and damaged.

When the layer thickness follows the contour of the corrugations, and when said layer has its maximum thickness in the area of the maximum diameter of the corrugations, it will in particular be possible to increase the strength in the area of the corrugations and there in the area of the maximum outer diameter. This can have an advantageous effect on the noise behavior of the hose. In particular when the stabilizing elements are provided on both sides of the corrugations, this can lead to a hose which is, on the one hand, sufficiently stiff and, on the other hand, sufficiently flexible for being installed in the engine compartment. Also this embodiment is again independent of the provision of a tubular portion in the interior of the hose.

Particularly advantageous results can be achieved, when the maximum layer thickness of the outer layer is larger than the underlying layer thickness of the hose. Especially for hoses whose corrugations have a substantially triangular cross-sectional configuration, the strength will be improved in the area of the maximum outer diameter.

According to another advantageous embodiment of the present invention, the corrugated portion and the tubular portion can be connected by a substance-to-substance bond. By means of a substance-to-substance bond, it is especially possible to produce the resonating cavities between the corrugations and the tubular portion in a simple and economy-priced manner.

The present invention additionally relates to a method of producing a flexible hose comprising a corrugated portion and a substantially tubular portion which is arranged at least sectionwise within the corrugated portion, said tubular portion being then introduced, from an extended position in which the corrugated and the tubular portion are arranged in succession, into the corrugated portion by turning said tubular portion outside in.

A corrugated hose according to the present invention, which has the necessary acoustic properties, can be produced rapidly and easily in this way.

In this connection, it may be of advantage when the hose is vulcanized only after having been turned outside in. Prior to the vulcanization, the hose blank is still soft and can therefore easily be turned outside in and given the shape desired.

In this respect, it may prove to be advantageous, when the tubular portion is drawn into the corrugated portion.

A particularly simple production method is obtained, when a mounting mandrel is used for turning the tubular portion outside in.

When such a mounting mandrel is used, it may prove to be advantageous, when the hose is pushed onto the mounting mandrel, whereby the hose is turned outside in.

Furthermore, it may prove to be advantageous, when the openings are formed in the tubular portion before said tubular portion is turned outside in. This allows the hose blank to be produced first, including all the tailoring and punching processes, whereupon the hose can be finished by turning it outside in.

In this connection, it may also prove to be advantageous, when the tubular portion and the corrugated portion are connected by a substance-to-substance bond.

Furthermore, the present invention relates to a flexible hose which comprises a corrugated portion and which is characterized in that said hose comprises, at least sectionwise, a plurality of layers including an outer layer.

By means of such a multi-layered structural design, the strength properties of the hose can be influenced accurately. This offers the possibility of providing, especially in damage-prone areas, additional, possibly particularly resistant layers.

In this respect, it may prove to be particularly advantageous, when the outer layer is arranged at least in the corrugated portion. Especially the corrugated portions with their areas of maximum circumference are damage-prone.

In the following, the mode of operation of the present invention will be explained in detail on the basis of an embodiment.

Figure 1:
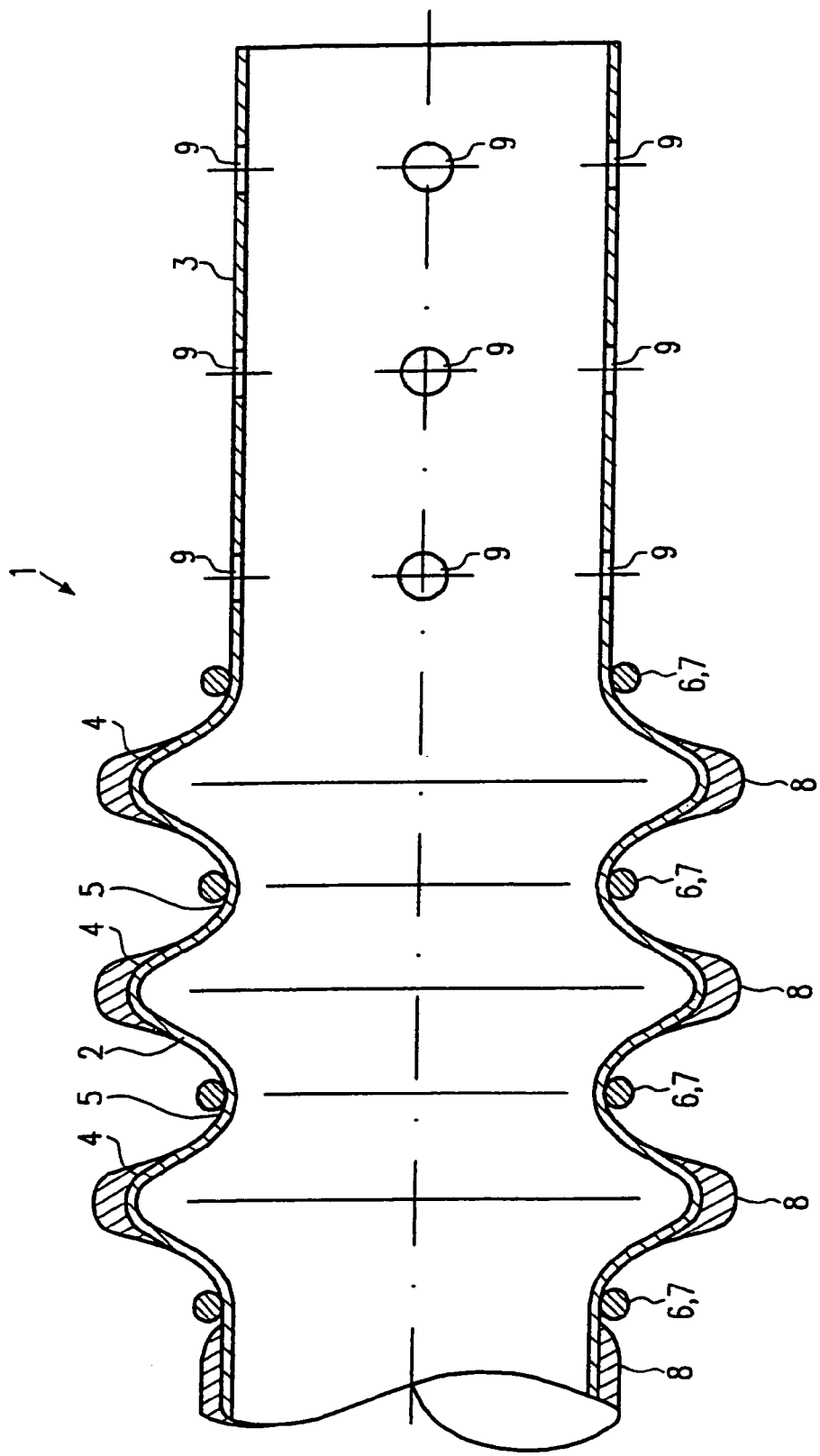
FIG. 1 shows the flexible hose according to the present invention in an extended position.

FIG. 1 shows the flexible hose 1 according to the present invention in a sectional view. The flexible hose 1 comprises a corrugated portion 2 and a tubular portion 3. In the representation according to FIG. 1, the flexible hose is at an extended position in which the corrugated portion and the tubular portion are arranged in succession. The corrugated and the tubular portion are integrally connected.

Figure 2:
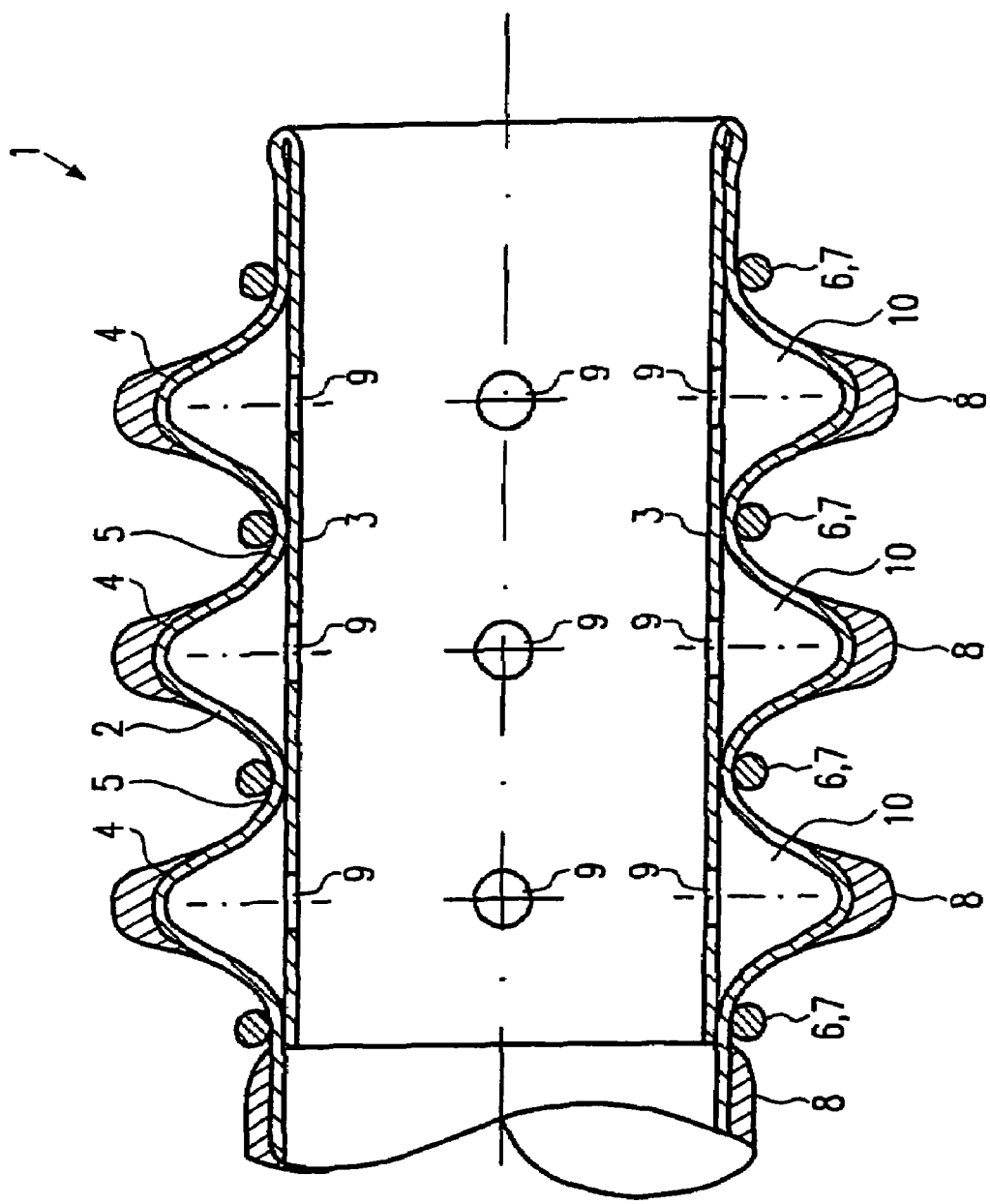
FIG. 2 shows the hose according to the present invention with the corrugated portion and the tubular portion in the mounted condition.

In FIG. 2 the flexible hose is shown in a mounted position in which the tubular portion 3 is arranged inside the corrugated portion 2.

The flexible hose is made of an elastomer material and is thus sufficiently flexible. The wall thickness is substantially uniform over the entire hose. The hose may be made of the same material in a uniform manner or it may, in the manner known, have incorporated therein reinforcement layers, such as layers of fabric, or comprise a plurality of layers.

In the embodiment shown, the corrugated portion 2 comprises three corrugations 4 having essentially the same shape. It is, however, also imaginable to give the corrugations different shapes. The outer diameter of the corrugations in the representation shown in FIG. 1 can, for example, increase from the left to the right. It is also imaginable to provide the middle corrugation of said three corrugations with the largest outer diameter. Furthermore, it is imaginable to change the number of corrugations or to provide a plurality of corrugated, spaced-apart portions. Due to the corrugations, wave troughs 5 are formed. The interior diameter of the wave troughs corresponds, at the narrowest point, substantially to the interior diameter of the hose in the representation according to FIG. 1 on the left-hand side of the corrugated portion.

The flexible hose is additionally provided with a stabilizing means 6 comprising, in the present example, four annular stabilizing elements 7 arranged in the wave troughs 5 and adjacent the two outer corrugations. The stabilizing elements encompass the hose and are in contact therewith. The stabilizing elements can be made e.g. of metal. They may also be made of plastic materials, the strength of the stabilizing elements exceeding that of the hose by far.

Furthermore, the flexible hose is provided with an outer layer 8 in certain sections thereof. Also this outer layer may be a layer of elastomer material. The strength of this material should preferably exceed that of the material of the underlying hose. In addition, the outer layer 8 is applied only in certain sections, viz. in the representation according to FIG. 1 on the left-hand side of the corrugations up to a point in the vicinity of one of the stabilizing means and, in addition, in the area of the respective corrugations. In the area of the corrugations, the outer diameter of the outer layer varies, said outer diameter having its largest dimension in the area of the largest diameter of the corrugation. The outer layer terminates towards the bottom of the wave trough 5. In an alternative embodiment, it is also imaginable to provide such an outer layer over the whole outer surface of the flexible hose. However, it turned out that in the embodiment according to the present invention the strength properties of the hose can be influenced accurately. In particular the vibration behavior is positively influenced by applying the outer layer 8 sectionwise to the outer periphery of the corrugations. The material used for the outer layer is, in addition, a material which is heavier than the material of the underlying hose so that the vibrations will be influenced. Furthermore, the more resistant outer layer has its largest thickness especially in the most wear-intensive areas at the largest outer diameter of the corrugations, whereby the service life of the hose will be extended and damage will be avoided.

The tubular portion 3 has substantially the shape of a cylinder barrel and is provided with openings 9 which are uniformly distributed over the circumference thereof. The arrangement of said openings 9 is chosen such that, in the representation shown in FIG. 2, each of said openings comes to lie in front of or in alignment with the crest of a respective corrugation. This has the effect that resonating cavities are formed, which are defined by the wall of the tubular portion and by the corrugations. The length of the tubular portion has here been chosen such that it extends substantially over the entire length of the corrugated portion.

In addition, a substance-to-substance bond can be provided between the tubular portion and the corrugations in the area of the wave trough. Ultrasonic welding or the like is imaginable as well.

In the present embodiment, the hose shown in the representation according to FIG. 1 is substantially straight in the extended condition. However, embodiments in which the corrugated portion as well as the tubular portion extend along a curve are imaginable as well. It is also imaginable that the tubular portion extends only over a part of the corrugated portion. Preferably, the hose is, however, implemented such that the tubular portion extends over the whole corrugated portion.

In the following, the mode of operation of the present invention will be explained in detail:

For producing the hose, said hose is first produced in the form of a straight blank in the manner known. Subsequently, the tubular portion is turned outside in, so that the hose configuration shown in FIG. 2 will be obtained. For this purpose, a tool in the form of a mandrel can be provided. Such outside-in turning is suitable for mechanical as well as for manual production processes.

Making use of the course of action according to the present invention, all the processes that are complicated from the point of view of manufacturing technology can be carried out in one operation. The openings, for example, are already formed in the tubular portion. Since the hose is mounted by turning the outside in, it is no longer necessary to produce two different components and to connect them subsequently. Due to the fact that the tubular portion is turned outside in, said tubular portion is accurately fixed in position within the corrugated portion in a simple manner.

Since the tubular portion has openings provided therein, resonating cavities 10 are formed between said tubular portion and the corrugations by means of which the acoustic behavior of the hose can be optimized. A further improvement of the acoustic behavior and of the wear resistance of the hose can be achieved by a subsequent sectionwise application of the protective outer layer. An additional stabilization and an improvement of the vibration properties can be achieved by the stabilizing means.

The invention claimed is:

1. A flexible hose, comprising at least one corrugated portion and a substantially tubular portion which is arranged at least sectionwise within the corrugated portion, wherein the corrugated portion is formed integrally with the tubular portion, and the tubular portion is introduced, from an extended position in which the corrugated and the tubular portions are arranged in succession, into the corrugated portion by turning said tubular portion outside in, wherein the tubular portion comprises openings, each of said openings being arranged in alignment with a crest of a respective corrugation of the corrugated portion so as to form a resonating cavity delimited by the corrugation and the tubular portion.

2. A flexible hose according to claim 1, wherein the tubular portion extends over the entire length of the corrugated portion.

3. A flexible hose according to claim 1, wherein each of said openings being associated with one of said corrugations.

4. A flexible hose according to claim 1, wherein the tubular portion and the corrugated portion are sectionwise in contact with one another at least in the area of the corrugations.

5. A flexible hose according to claim 1, wherein the wall thickness of the corrugated portion corresponds essentially to the wall thickness of the tubular portion.

6. A flexible hose according to claim 1, wherein the inner diameter of the tubular portion corresponds essentially to 10 to 15 times the wall thickness of the tubular portion.

7. A flexible hose according to claim 1, wherein a stabilizing means is provided.

8. A flexible hose according to claim 7, wherein the stabilizing means comprises a plurality of spaced-apart stabilizing elements.

9. A flexible hose according to claim 8, wherein the respective stabilizing elements are arranged adjacent to the corrugations.

10. A flexible hose according to claim 8, wherein the stabilizing elements are arranged in the wave troughs of the corrugations.

11. A flexible hose according to claim 8, wherein the stabilizing elements encompass the corrugated portions in the form of rings.

12. A flexible hose according to claim 1, wherein the hose comprises a plurality of layers, including at least one outer layer, in certain sections thereof.

13. A flexible hose according to claim 1, wherein the outer layer is arranged in the area of the corrugations.

14. A flexible hose according to claim 1, wherein the layer thickness of the outer layer varies.

15. A flexible hose according to claim 1, wherein the layer thickness follows the contour of the corrugations, said layer having its maximum thickness in the area of the maximum diameter of the hose.

16. A flexible hose according to claim 1, wherein the maximum layer thickness of the outer layer is larger than the underlying layer thickness of the hose.

17. A flexible hose according to claim 1, wherein the corrugated portion and the tubular portion are connected by a substance-to-substance bond.

18. A flexible hose according to claim 1, wherein the corrugated portion, includes an outer layer of elastomer material arranged in spaced-apart sections on an outer periphery of the corrugated portion.

19. A flexible hose according to claim 1, wherein the hose is Configured as a charge-air hose for an automotive vehicle.

* * * * *